United States Patent [19]

McCullough et al.

[11] Patent Number: 5,198,702
[45] Date of Patent: Mar. 30, 1993

[54] CONTROL AND SAFETY SYSTEM FOR ELECTRICALLY OPERATED DEVICES

[76] Inventors: Timothy J. McCullough, 833 Aurora Rd., Vermilion, Ohio 44089; Giorgio Grasselli, Via L. Roversi No 2, 42020 Albinea, Italy

[21] Appl. No.: 657,208
[22] Filed: Feb. 19, 1991

[30] Foreign Application Priority Data

Mar. 7, 1990 [IT] Italy ................................. 46821 A/90

[51] Int. Cl.$^5$ ................................................ F16P 3/00
[52] U.S. Cl. ..................................... 307/326; 307/116; 192/131 R
[58] Field of Search ............... 307/112, 116, 125, 139, 307/154, 326; 192/130, 131 R, 131 H

[56] References Cited

U.S. PATENT DOCUMENTS

| | | |
|---|---|---|
| 721,270 | 2/1903 | Zeckendorf .......................... 219/549 |
| 941,726 | 11/1909 | Pfalzgraf ............................. 192/130 |
| 2,978,084 | 4/1961 | Vilkaitis .............................. 192/131 R |
| 3,011,610 | 12/1961 | Stiebel et al. ........................ 192/131 |
| 3,047,116 | 7/1962 | Stiebel et al. ........................ 192/131 |
| 3,370,233 | 2/1968 | Morelock ............................ 324/158 |
| 3,785,230 | 1/1974 | Lokey .................................. 83/58 |
| 4,026,177 | 5/1977 | Lokey .................................. 83/835 |
| 4,039,060 | 8/1977 | Williams et al . ................... 192/131 R |
| 4,195,722 | 4/1980 | Anderson et al. ................... 192/131 R |
| 4,321,841 | 3/1982 | Felix ................................... 74/615 |
| 4,391,358 | 7/1983 | Haeger ................................ 192/130 |
| 4,621,300 | 11/1986 | Summerer .......................... 361/175 |
| 4,965,909 | 10/1990 | McCullough et al. ............. 192/131 R |
| 5,025,175 | 6/1991 | Dubois III .......................... 307/326 |

FOREIGN PATENT DOCUMENTS 3501021 of 1985 Fed. Rep. of Germany .

Primary Examiner—Jeffrey A. Gaffin
Attorney, Agent, or Firm—Michael Sand Co.

[57] ABSTRACT

A control and safety system for electrically operated devices with a cutting tool (9) connected to a reversible electric motor (88), and control means for halting and reversing the movement of said motor comprises a pair of electrically conducting gloves (A) and (B) adapted to be worn by the operator and connected by a conducting wire (2,3) to a box (4) fixed to the operator's body containing a rechargeable battery and an electronic sensor-transmitter circuit (120) arranged to emit a light pulse when the golves are both worn by the operator and to interrupt the light pulse when one of the two gloves or part of the operator's body accidentally makes contact with any metal part of the device (10). An optical fiber (12) connects said box (4) to the base of the device where it is connected to a receiving control circuit (121) located thereat. A manually operable reset pushbutton is mounted on said box to reset the conditions of the electronic circuit contained therein after each operation; and a pedal (23) is mounted on the base of the device and arranged to energize one or the other or neither of the circuits of the reversible electric motor (88) via a pair of relays (R1, R2), of which one is normally closed and the other is normally open.

4 Claims, 4 Drawing Sheets

CONTROL AND SAFETY SYSTEM FOR ELECTRICALLY OPERATED DEVICES

BACKGROUND OF THE INVENTION

A control system for motor-operated power machines is known which ensures operator safety by instantaneously interrupting power to the motor driving the rotary tool, such as a blade, saw or the like, when an electrically conducting metal glove worn by the operator or his hand makes contact with the tool or other conducting part of the machine. The conducting metal glove is covered with an insulating sheath, such as a glove plastic sheet glove, to prevent electrical connection being made via for example a bulk of meat handled by the operator.

The operator's glove, or a conducting arm band worn by him, is electrically connected to a safety switch which instantaneously disconnects the power when the operator's glove or hand closes a circuit by touching a part of the machine.

The control system comprises means for reversing the polarity of the electric motor, and further reduces the possibility of damage to the operator by, if appropriate, rotating the motor in the reverse direction through a fraction of a revolution. A manual switch has to be operated to reset the configuration of the safety circuit to its state prior to intervention. Each metal glove is connected to the safety switch by an electrode fixed to the operator's wrist in proximity to the glove, and the two electrodes have to be worn by the operator to make it possible to connect current to the motor for the rotating element.

Such a system is fully described in various embodiments in U.S. Pat. No. 4,965,909 in the name of the present applicants.

The aforesaid system requires the operator to wear two electorally conducting gloves, which are connected via electric wires provided with suitable plugs to corresponding sockets in the body of the power machine, such as a skinning machine.

The plugs and sockets are of coaxial type in the sense that they comprise a pin plus a central receiving seat for connection to one wire, and a coaxial skirt external to the pin plus a receiving cavity for connection to the other wire.

Said two wires are connected to a safety circuit such as that shown in FIG. 6 of said U.S. Pat. No. 4,965,909 which is contained in the base of the machine and receives current from the general machine circuit shown in FIG. 5 of said European patent application.

Furthermore in the system illustrated in said U.S. Patent only one glove is directly connected to the control circuit, the other glove being connected electrically to the first via the operator's body; a single control circuit thus responds to the pulses emitted by both gloves. Although having proved effective, the system illustrated in said U.S. Patent has a series of drawbacks as listed below.

First, the electronic circuit which receives the signals from the electrically conducting gloves is powered, via a transformer, by the general machine circuit connected to the mains, with the result that abnormalities or malfunctions could arise, producing electrical discharges across the gloves, with imaginable consequences for the operator.

The possibility, although remote, of return currents dangerous to the operator, makes it also very difficult to obtain certification for the system in those countries in which safety codes are most severe.

In addition, the plug of the coaxial cable which connects the gloves to the machine structure is highly sensitive to moisture, and any occurring condensation can short-circuit the two poles of the cable, to enable the machine to run even when the operator is not wearing the gloves.

This phenomenon is of considerable annoyance because skinning machines, to which the invention is mostly applicable, operate in moist environments in which considerable use of water is made. Lastly, as the two metal gloves are connected together by the operator's body but only one of the gloves is connected to the safety circuit, they have proved to have different sensitivities, the glove directly connected to the circuit being much more sensitive than the other glove.

The following improvements are proposed according to the present invention to overcome the aforesaid drawbacks.

First, the electronic safety circuit which generates the pulses and feeds them to the machine electric circuit to interrupt power to the motor, is powered by an independent 12 V. d.c. battery and is no longer located in the base of the machine but on the operator.

Secondly, said electronic circuit no longer serves both gloves, and instead an independent circuit is provided for each glove. Lastly, the signals or pulses of the electronic safety circuit are transmitted to the machine electric circuit by an optical fibre.

BRIEF DESCRIPTION OF THE DRAWINGS

The merits and the operational and constructional characteristics of the invention will be more apparent from the detailed description of a preferred embodiment given hereinafter by way of non-limiting example with reference to the figures of the accompanying drawings.

Similar numerals refer to similar parts throughout the drawings.

DESCRIPTION OF THE PREFERRED EMBODIMENT

Figure 2:
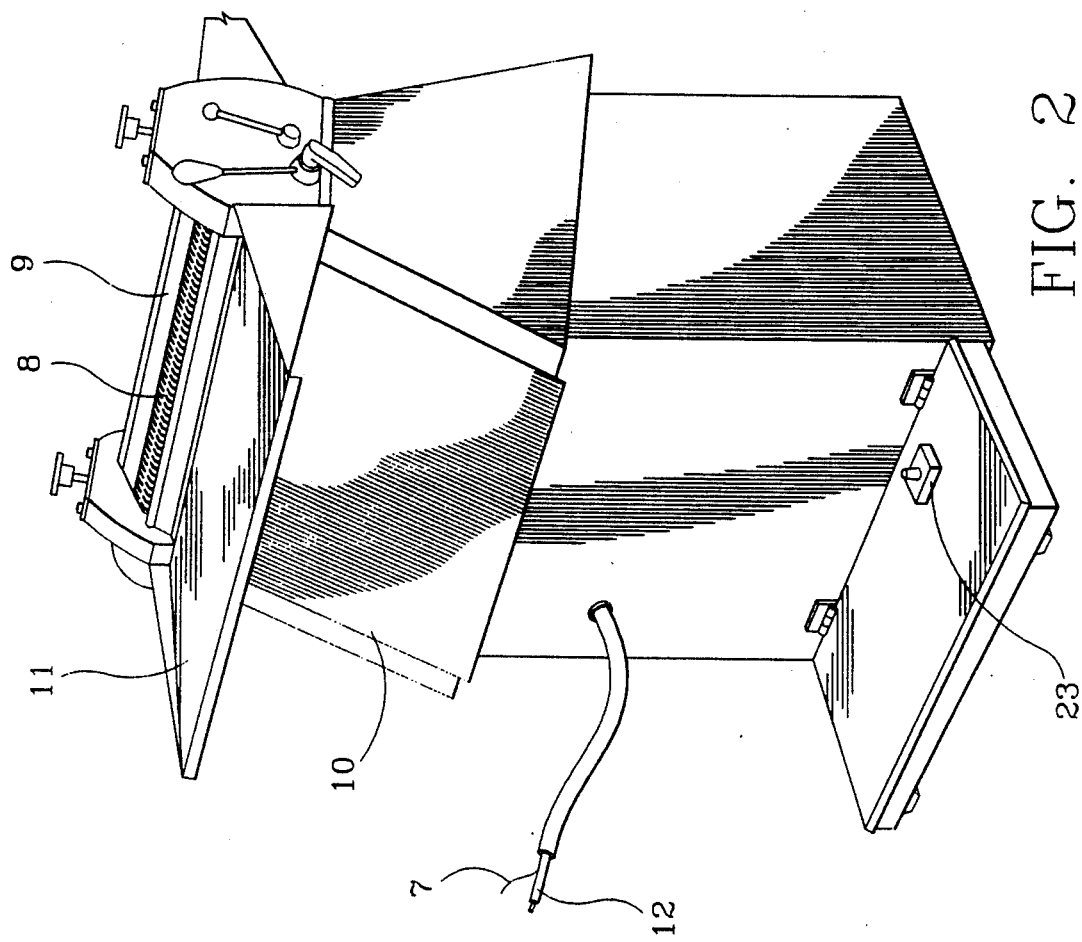
FIG. 2 is a perspective view of a skinning machine comprising the invention.
Figure 1:
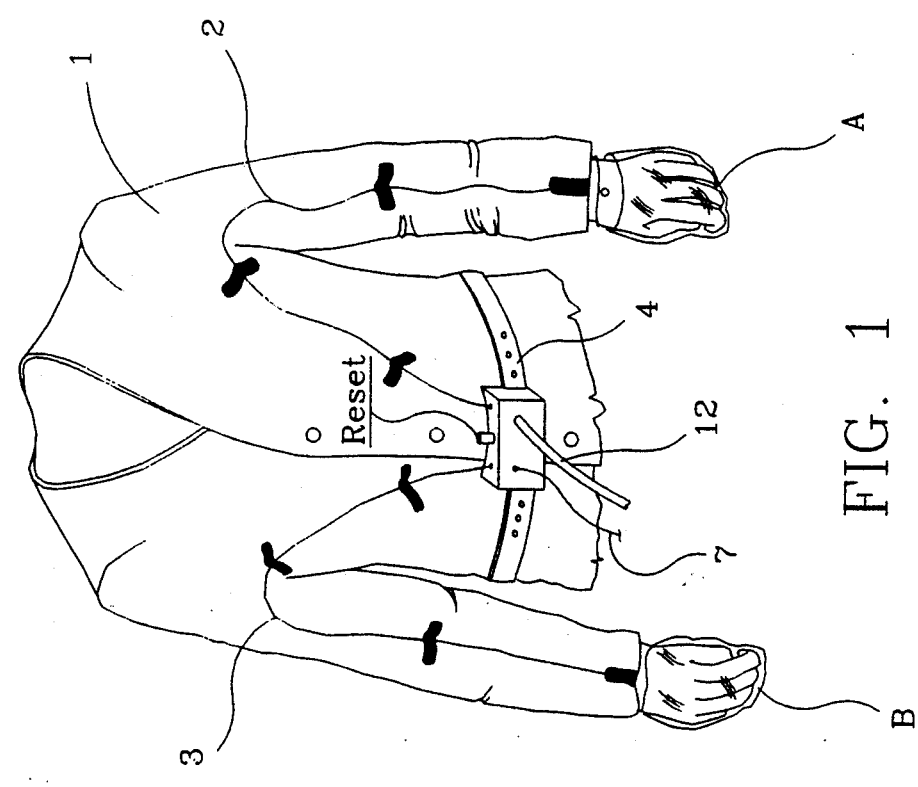
FIG. 1 shows that part of the invention worn by the operator.

The figures show a working coat 1 completed by two metal mesh gloves A and B, from each of which a conductor wire 2, 3 extends to a box 4 fixed in any convenient manner to the operator's body. The box contains a 12 V rechargeable battery 5 of about 2 Ah powering a circuit such as that of FIG. 5, from which there extends an optical fiber cable 12 and a conductor cable 7 connected both to earth and to the feed roller 8 which feeds the meat under the skinning blade 9 of the machine 10.

Figure 4:
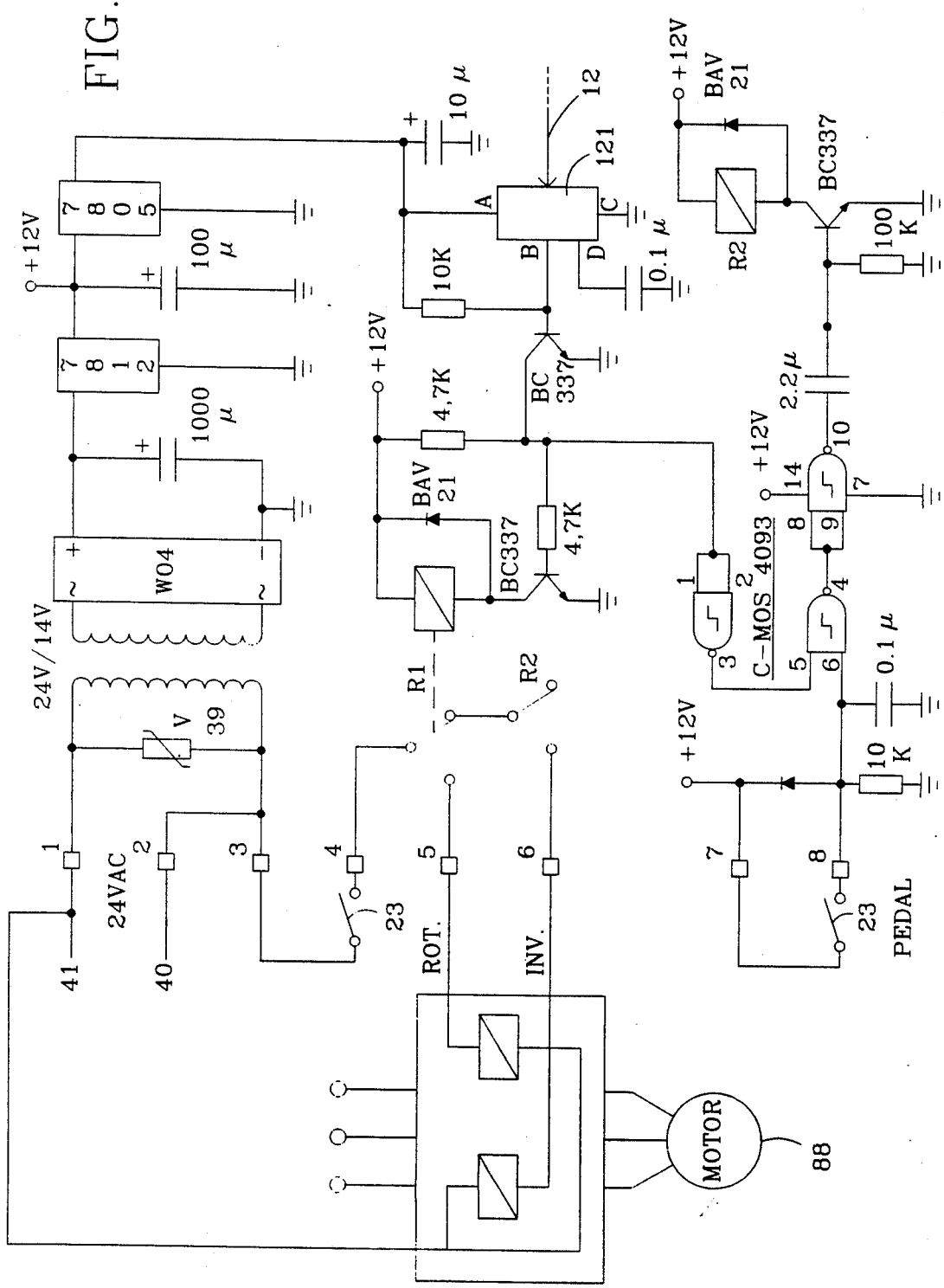
FIG. 4 is a detailed representation of the receiver and control unit housed in the machine.

The cables 12 and 7 are connected to the skinning machine 10 (FIG. 2) which contains the circuit of FIG. 4.

As regards the present description, the machine 10 upperly comprises a table 11 located upstream of a knurled roller 8, or motorized feed roller, downstream of and close to which there is the skinning blade 9.

Figure 3:
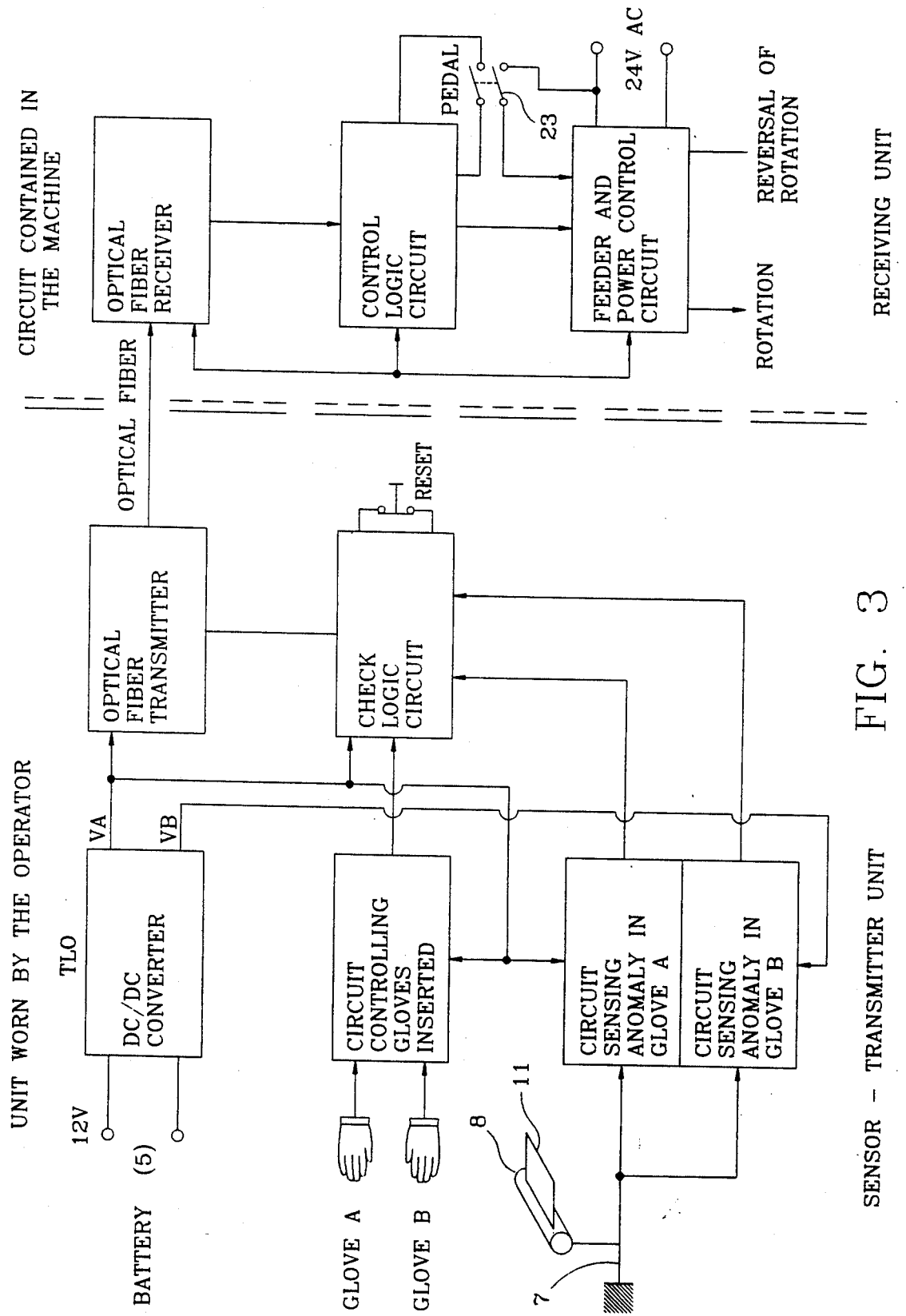
FIG. 3 shows the block diagram of the electrical and electronic part of the invention.

That part of the electronic circuit of the machine 10 comprising the safety device according to the present invention is shown schematically as a block system in FIG. 3.

The electronic circuit of the machine 10 is connected by an optical fiber 12 or equivalent device to the electronic circuit which senses and transmits abnormal situations, this circuit being completely housed in the box 4 fixed to the operator's body. Said circuit is schematically illustrated in FIG. 3, again by a block system. Both of these circuits are shown in detail in FIGS. 4 and 5 respectively.

Figure 5:
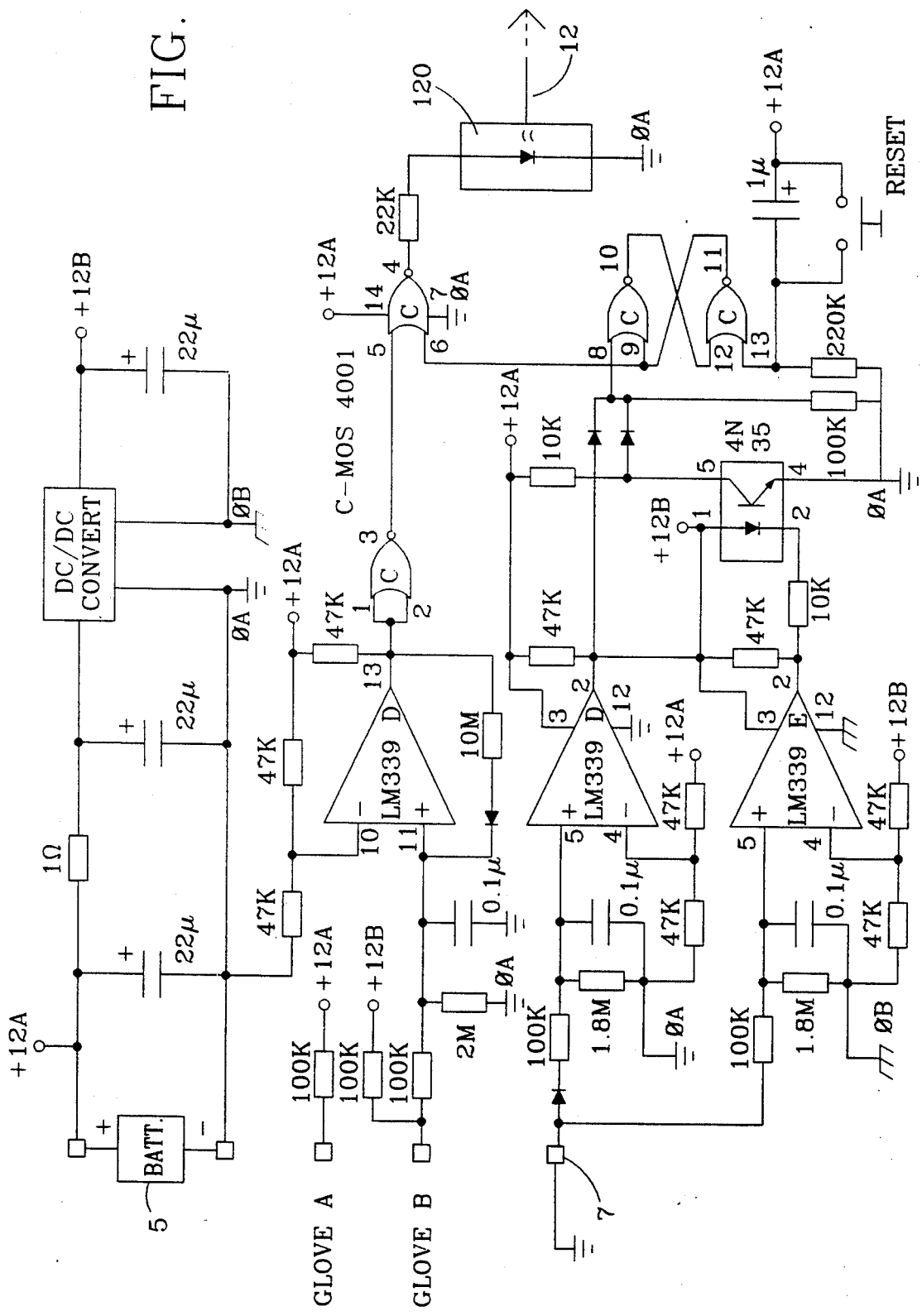
FIG. 5 is a detailed representation of the sensor-transmitter unit located on the operator.

FIG. 5 will first be examined, although components indicated by totally normal symbols will not be described, the description being limited to that necessary for understanding operation. The 12 V battery 5 powers via the DC/DC converter, two separate circuits in which the live poles are indicated by +12A and +12B, whereas the poles at zero voltage are indicated by the symbols 0A and 0B respectively.

To each of said circuit there is connected a metal glove A and B respectively, these both being connected to earth via the cable 7. When both gloves are worn by the operator, the block 120 (FIG. 5) emits via the optical fiber 12 a light signal which when received by the block 121 (FIG. 4) enables normal machine operation.

Both of these circuits are connected to a memory circuit consisting of a flip-flop circuit indicated by the letters C on the schematic, so that any accidental contact between one or the other metal glove with the roller 8 or with one of the metal parts electrically connected to it modifies a usual electronic circuit contained in the block 120, which interrupts the light pulse through the optical fibre 12.

After each interruption of the light signal the circuit is zeroed by a pushbutton indicated on the schematic as RESET and operated by the operator.

The optical fiber 12 is connected to the receiver block 121 forming part of the circuit contained in the machine base and illustrated in FIG. 4. No detailed description of this circuit is given as it is immediately understandable from the drawing. It is powered from the mains with 24 V alternating current via the poles 41 and 40, from which by means of a diode rectifier bridge and the illustrated circuit, two direct current voltages are made available, namely 12 V and 5 V.

The 5 V direct current powers the block 121 which receives the signals from the optical fiber, whereas the 12 V direct current powers the circuit which receives the electrical signals emitted by the block 121 and transmits them to two relays R1 and R2. When the block 121 receives the light signal from the optical fiber 12 the relay R1 is energized to close the contact which enables motor rotation, if the pedal 23 is also pushed.

Under these conditions, with the relay R1 closed the motor 88 is energized with the required polarity for its normal operation. When the receiver block 121 no longer receives the light signal from the optical fiber 12 it emits an electrical pulse to open the relay R1 and close the relay R2. The motor 88 stops and then starts again in the opposite direction for a fraction of a revolution, to then stop permanently.

The initial conditions can only be reset by pushing the RESET pushbutton mounted on the box 4 and then releasing it, to zero the sensor-transmitter circuit of FIG. 4 which is contained therein. From the aforegoing description and the schematics of FIGS. 4 and 5 it is apparent that there is no electrical connection between the operator and the machine, the only connection between them being the optical fiber 12 and the earth cable 7, which can be contained in the same sheath.

All the electronic components indicated on the schematics are of normal commercial availability under the given symbols.

Accordingly, the improved control and safety system for electrically operated devices is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved control and safety system for electrically operated devices is constructed and used, the characteristics of the construction, and the advantageous, new and useful results obtained; the new and useful structures, devices, elements, arrangements, parts and combinations, are set forth in the appended claims.

We claim:

1. A control and safety system for an electrically operated device of the type comprising a cutting tool (9) connected to a reversible electric motor (88), and control means for halting and reversing the movement of said motor, including a pair of electrically conducting gloves (A) and (B) adapted to be worn by an operator and connected by conducting wires (2,3) to a box (4) affixed to the operator's body and containing a rechargeable battery and an electronic sensor-transmitter circuit (120) arranged to emit a light pulse when the gloves are both worn by the operator and to interrupt said light pulse when one of the two gloves or part of the operator's body accidentally makes contact with any metal part of the device (10); an optical fiber (12) arranged to connect said box (4) to a base of the device, where it is connected to a receiving control circuit (121) located thereat; a manually operable reset pushbutton mounted on said box to reset the electronic circuit contained therein after each operation; and a pedal (23) mounted on the base of the device and arranged to energize one or the other or neither of the circuits of the reversible electric motor (88) via a pair relays (R1, R2), of which one is normally closed and the other is normally open.

2. A system as claimed in claim 1 in which the sensor-transmitter circuit (120) is connected to earth.

3. A system as claimed in claim 1 in which the sensor-transmitter circuit (120) comprises two direct current-powered circuits at electrically separated voltages, one for each glove (A) and (B).

4. A system as claimed in claim 1 in which the sensor-transmitter (120) comprises at least one memory circuit.

* * * * *